(12) United States Patent
Umemoto

(10) Patent No.: US 9,160,868 B2
(45) Date of Patent: Oct. 13, 2015

(54) DOCUMENT READING APPARATUS, DOCUMENT READING METHOD AND STORAGE MEDIUM

(71) Applicant: CANON KABUSHIKI KAISHA, Tokyo (JP)

(72) Inventor: Takashi Umemoto, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/275,587

(22) Filed: May 12, 2014

(65) Prior Publication Data

US 2014/0347705 A1    Nov. 27, 2014

(30) Foreign Application Priority Data

May 23, 2013    (JP) .................................. 2013-108588

(51) Int. Cl.
  *H04N 1/04*    (2006.01)
  *H04N 1/00*    (2006.01)
  *H04N 1/40*    (2006.01)
  *H04N 1/401*   (2006.01)

(52) U.S. Cl.
  CPC .......... *H04N 1/00092* (2013.01); *H04N 1/401* (2013.01); *H04N 1/40093* (2013.01)

(58) Field of Classification Search
  CPC  H04N 1/00092; H04N 1/40093; H04N 1/401
  USPC .................................. 358/474, 496, 497, 498
  See application file for complete search history.

(56) References Cited

U.S. PATENT DOCUMENTS 6,975,360 B2 *  12/2005  Slatter .......................... 348/370

FOREIGN PATENT DOCUMENTS

JP        2004-274299        9/2004

* cited by examiner

*Primary Examiner* — Houshang Safaipour
(74) *Attorney, Agent, or Firm* — Fitzpatrick, Cella, Harper & Scinto

(57) ABSTRACT

Provided is a document reading apparatus for identifying irregular shadow generated when reading document and for correcting the identified irregular shadow. Lights are irradiated toward the reading areas of the document from a plurality of directions with different light amount. Through the photoelectric conversion of the reflected light, the first image data of a target pixel and the second image data of the target pixel are obtained. Then, through the determination of the type of the document of the target pixel based on the first data and the second data of the target pixel and through the verification (re-determination of the document type) based on the type of the document of peripheral pixel adjacent to the target pixel, irregular shadow is accurately identified.

11 Claims, 10 Drawing Sheets

| A | B | C | D | E | F |
|---|---|---|---|---|---|
| 225 | 225 | 225 | 225 | 225 | 225 |

DOCUMENT READING APPARATUS, DOCUMENT READING METHOD AND STORAGE MEDIUM

BACKGROUND OF THE INVENTION

1. Field of the Invention

The present invention relates to a document reading apparatus which irradiates light toward document and generates image data representing content described in the document through photoelectric conversion of the reflected light and a document reading method.

2. Description of the Related Art

Generally, a document reading apparatus is configured to, after a document is irradiated with light from light source, guide the reflected light from a document surface to an photoelectric conversion element. Typically, as a document for reading, a paper document with some irregularities, e.g., bumps and dents, thereon is used. However, a document with metallic gloss or photos etc., may be used as a document for reading. The term "metallic gloss" refers gold color or silver color having very high glossiness like the document on which foils are transferred through hot stamping. The photoelectric conversion element generates image data representing content printed on such a document.

FIGS. 8 and 9 are schematic diagrams illustrating, with arrow lines, directions to which lights irradiated toward general paper document are reflected. If a document surface of paper document 50 is rough and many fine irregularities exist thereon, radiation light 60 is respectively reflected by the irregularities, as shown in FIG. 8. Therefore, reflected light 71 is diffused in various directions. On the other hand, the reflected light 71 of the radiation light 60 irradiated toward the document surface of the document 51 having high glossiness is, as shown in FIG. 9, almost equal to a regular reflection light 72. The regular reflection refers reflection in a direction symmetric with respect to an incident angle, in which the incident angle θ is equal to the reflection angle θ. The document 51 having high glossiness includes a document on which foils are transferred through hot stamping, photos and the like.

As above, depending on a surface state of the document (state of the part of the document to be read, hereinafter referred to as "reading area"), the ratio of the regular reflection light 72 largely changes.

In a conventional document reading apparatus, however, lights diffusing in a vertical direction with respect to the surface of a document 50 and a document 51 are guided to photoelectric conversion element. Therefore, in case of the document 51 having high glossiness, though the ratio of the regular reflection light 72 with respect to the total reflected light 71 is very high, the regular reflection light 72 is not guided to the photoelectric conversion element. Unfortunately, as a result, the image data represents an image with low luminance.

A technology could be a solution to this problem is disclosed, for example, in Japanese Patent Application Laid-open No. 2004-274299 as an image reading apparatus. The image reading apparatus comprises a normal first light source for reading paper document. In addition to this, the image reading apparatus comprises a second light source dedicated to reading gloss document.

A document is irradiated with light by the second light source, which is the same emission wavelength as the first light source, at an irradiation angle different from that of the first light source. In case of the document having high glossiness, the regular reflection light of the second light source is guided to the photoelectric conversion element. Further, providing light adjustment means such as liquid crystal shutter between the second light source and the document reduces the irradiation amount toward the document surface by the second light source.

The image reading apparatus as disclosed in Japanese Patent Application Laid-open No. 2004-274299, however, still has following problems.

FIG. 10A is a schematic diagram illustrating reflected lights in reading areas A to F of a document 52 having a surface which is an ideal mirror in terms of its surface condition such as glossiness, flatness, surface roughness. FIG. 10B shows image data (which is a luminance value in 256 gradations) in reading areas A to F which are read and output by the image reading apparatus as disclosed in Japanese Patent Application Laid-Open No. 2004-274299. Further, FIG. 11A is a schematic diagram illustrating reflected light in the reading areas A to F in case of the document 51 having high surface glossiness. FIG. 11B shows image data (which is a luminance value in 256 gradations) in the reading areas A to F which are read and output by the image reading apparatus as disclosed in Japanese Patent Application Laid-open No. 2004-274299.

In the image reading apparatus as disclosed in Japanese Patent Application Laid-Open No. 2004-274299, a first mirror 91 is placed in a path of the regular reflection light of the second light source. Then, the regular reflection light reflected by the first mirror 91 is guided to the photoelectric conversion element 95 through a second mirror 92 and a third mirror 93. As shown in FIG. 10A, if the surface of the document is an ideal mirror surface which only reflects the regular reflection light, the reflected light travels toward path 100, which is directed to the first mirror. Therefore, as shown in FIG. 10B, correct image data are obtained in the reading areas A to F. It is general, however, that even the document having high glossiness, there are some irregularities on the surface. Therefore, most reflected lights turn to the regular reflection light, however, not all the reflected lights turn like that.

In this case, in the image reading apparatus as disclosed in Japanese Patent Application Laid-open No. 2004-274299, in which light is irradiated only from one direction, reflection light which travels in a direction different from that of the regular reflection light is generated as shown in FIG. 11A. This results in a generation of pixel which is almost incapable of guiding the reflected light to the photoelectric conversion element 95. This generates shadowed image data of read areas A and F, as shown FIG. 11B, for example. When such image data are read, there will be many black shadows (hereinafter referred to as irregular shadow) on metallic gloss.

SUMMARY OF THE INVENTION

According to one aspect of the present disclosure, there is provided a document reading apparatus for identifying irregular shadow generated when reading a document and for correcting the identified irregular shadow.

According to the other aspect of the present disclosure, there is provided a document reading method for preventing the generation of the irregular shadow when reading document.

The document reading apparatus of the present disclosure comprises a photoelectric conversion unit configured to photoelectrically convert input light; a guide unit configured to guide reflected light of light irradiated toward a reading area of a document to the photoelectric conversion unit; a first light source capable of irradiating light toward the reading area; a second light source capable of irradiating light toward the reading area from a direction different from that of the first light source, a light amount of the second light source being smaller than that of the first light source; a first determination unit configured to determine a document type of the target pixel based on a first image data of a target pixel and a second image data of the target pixel, the first image data is obtained through a photoelectric conversion of the reflected light irradiated from the first light source and the second image data is obtained through a photoelectric conversion of the reflected light irradiated from the second light source; a second determination unit configured to re-determine a document type of the target pixel based on the determination result of the target pixel and the determination result of peripheral pixel of the target pixel, and a generation unit configured to generate image data of the target pixel based on the first image data and the second image data in accordance with the document type determined by the first discrimination unit or the second discrimination unit.

Further features of the present invention will become apparent from the following description of exemplary embodiments (with reference to the attached drawings).

DESCRIPTION OF THE EMBODIMENTS

Now, embodiments of the present disclosure are described with reference to the drawings.

As is clarified from the following embodiments, according to the document reading apparatus of the present disclosure, based on the first image data of target pixel and the second image data of the target pixel, the document type of the target pixel is determined by the first determination unit. Further, based on the determination result and a determination result of peripheral pixel of the target pixel, the document type of the target pixel is re-determined by the second determination unit. According to the document type determined by the first determination unit or the second determination unit, the image data of the target pixel is generated based on the first image data and the second image data.

This enables to determine the type of the document, whether it is paper document, luster document or metal gloss document. Further, the target pixel which may be of irregular shadow is identified. Based on the type of the document of the peripheral pixels adjacent to the target pixel, it is determined whether or not the target pixel is the irregular shadow. Therefore, it is possible to accurately identify the pixel representing irregular shadow. As above, through the accurate identification of the pixel representing the irregular shadow, it is possible to generate a document image without irregular shadow is occurred even though there are some irregularities on the reading areas of the document.

Configuration of a Document Reading Apparatus.

Figure 1:
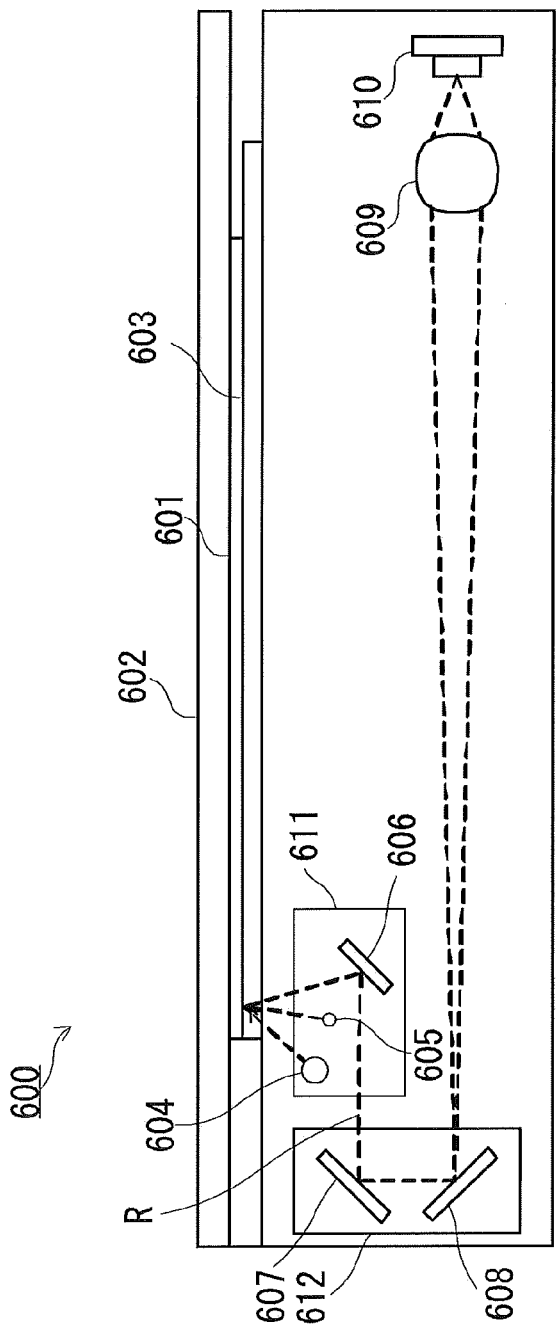
FIG. 1 is a schematic vertical partial view illustrating a document reading apparatus according to an embodiment of the present invention.

FIG. 1 is a schematic vertical partial view illustrating a document reading apparatus according to an embodiment of the present invention. The document reading apparatus 600 comprises a pressing plate 602 for pressing a document 601 which is a reading target. It also comprises a document glass 603, on which the document 601 is placed so that its reading surface (hereinafter referred to as "document surface") is opposed to the document glass. The document reading apparatus also comprises an illumination unit 611 which scans when reading the paper document and a light guide unit 612 which is movable in association with of the illumination unit 611. In the following description, the term "reflected light" means "diffused light" as well as "regular reflection light".

The illumination unit comprises a first light source 604, a second light source 605 and a first mirror 606 for guiding reflected light R to the guide unit 612, the reflected light R being the light reflected when the document 601 is irradiated with these lights. The guide unit 612 has a built-in second mirror 607 and a built-in third mirror 603 for guiding the reflected light R input from the first mirror 606 to a photoelectric conversion element 610 via a condensing lens 609. The operation of the document reading apparatus 600 is controlled by a control part (not shown). The first light source 604 is placed in such a manner that its regular reflection light is not guided to the photoelectric conversion element 610.

The illuminance of the document surface in the reading areas of the second light source 605 is smaller than that of the first light source 604. That is, the light amount of the second light source 605 is smaller than that of the first light source 604. Further, the second light source 605 is placed in such a manner that its regular reflection light is guided to the photoelectric conversion element 610. In case of a paper document having low glossiness, reflected light is diffused so that a part of the irradiated light is guided to the photoelectric conversion element 610. On the contrary, in case of a document having high glossiness, reflection light is rarely diffused. Therefore, in a situation where the light amount of light from the first light source 604 is equal to that from the second light source 605, when a document having high glossiness is read, the light amount exceeds light receiving limit of the photoelectric conversion element 610, since almost all light from the second light source 605 is guided to the photoelectric conversion element 610. Therefore, in the present embodiment, the light amount of the second light source 605 is made small.

Figure 2:
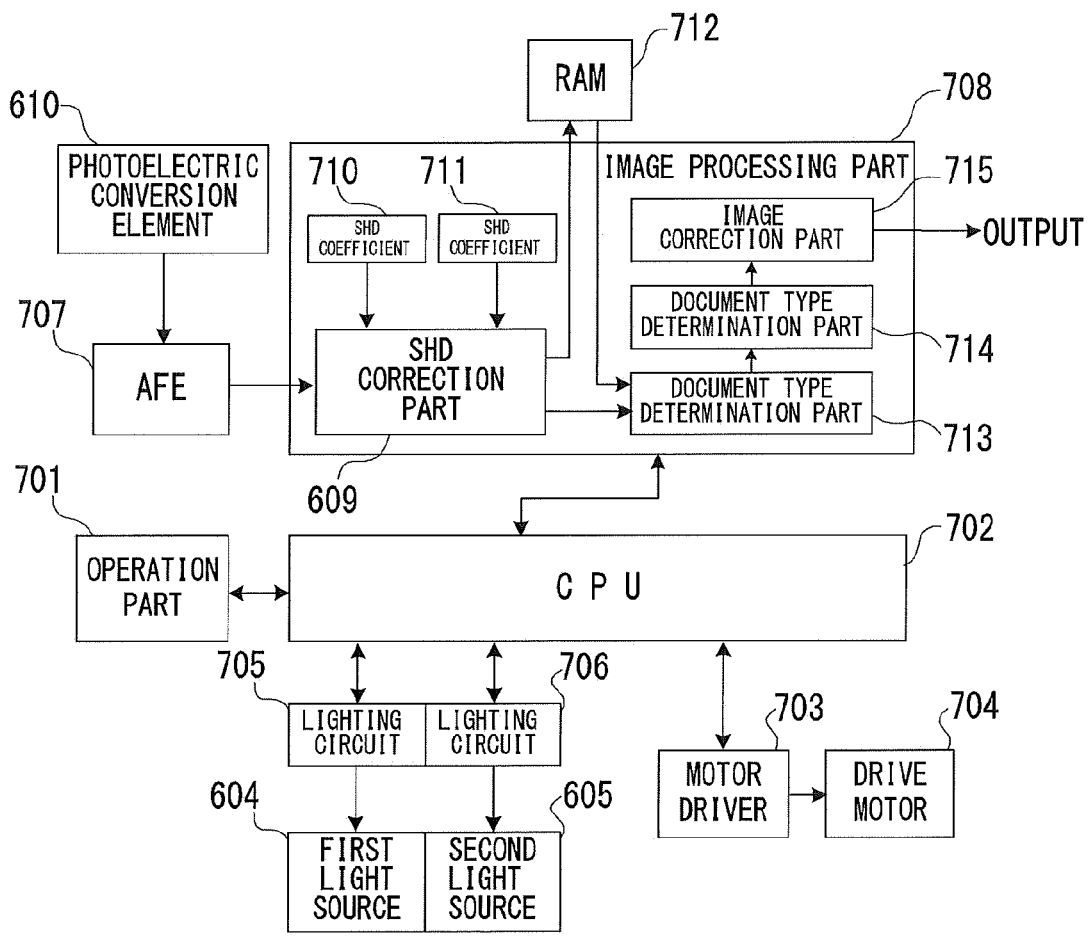
FIG. 2 is a configuration block diagram of a control part of the document reading apparatus.

Then, description is made with regard to the control part of the document reading apparatus 600. FIG. 2 is a configuration block diagram of the control part. The control part comprises an operation part 701 for receiving input from user. Also, the control part comprises a central processing unit (CPU) 702, which operates in accordance with a predetermined control program.

The CPU 702 controls a motor driver 703, lighting circuits 705 and 706, an image processing part 708 in accordance with input information input by a user through the operation part 701. The input information includes setting of reading mode, instruction to start reading and the like. When receiving the control signal from the CPU 702, the motor driver 703 outputs excitation current to a drive motor 704. The drive motor 704 is a motor for driving the illumination unit 611 as shown in FIG. 1, which enables document scanning.

When receiving the control signal from the CPU 702, the lighting circuit 705 lights the first light source 604. When receiving the control signal from the CPU 702, the lighting circuit 706 lights the second light source 605. The reading areas of the document 601 is then irradiated with light. The reflected light from the document surface of the document 601 is reflected by a mirror 606, a mirror 607, and a mirror 608, respectively, and condensed by the condensing lens 609 and guided to the photoelectric conversion element 610. The photoelectric conversion element 610 sequentially converts the received reflected light to analog image signal and outputs the signal. The analog image signal is the signal of luminance corresponding to the glossiness of the document.

The analog image signal output from the photoelectric conversion element 610 is guided to an analog front end (AFE) 707. The AFE 707 is a circuit (IC) which executes various analog processes and converts the resultant analog image signal to digital data (image data). The analog process, in this embodiment, refers a sample hold process, an offset process and a gain process. Further, the image data is luminance value of 0 to 255 gradations representing glossiness.

The image data output from the AFE 707 is input to the image processing part 708. The image processing part 708 comprises a shading (SHD) correction part 609, document type determination parts 713 and 714, and an image correction part 715.

The SHD correction part 609 corrects problems of variations in characteristics of complementary metal oxide semiconductor (CMOS). It also corrects problem caused by an optical factor such as a decrease of the light amount of the end part of the light source. Such a correction is called SHD correction. For such SHD correction, SHD coefficient is used. The SHD coefficient is calculated based on the result obtained by reading a reference plate (not shown) provided on the document reading apparatus 600. The document reading apparatus 600 comprises two different light sources, the first light source 604 and the second light source 605. Therefore, the SHD coefficients 710 and 711 respectively corresponding to the first light source 604 and the second light source 605 are calculated. A random access memory (RAM) 712 stores image data corrected in the SHD correction part 609.

The document type determination part 713 compares the image data stored in the RAM 712 with newly read image data per pixel and determines the type of the document. Also, the document type determination part 713 identifies pixel which further needs to determine the type of the document. The process is called "first determination process". Based on the result obtained by the first determination process, the document type determination part 714 executes a process to further determine the type of the document (re-determination process). The process is called "second determination process".

Based on the result of the first determination process and the second determination process, the image correction part 715 selects, by pixel unit, either the image data stored in the RAM 712 or the newly read image data. Further, the image correction part 715 corrects the selected image data (luminance value). The corrected image data is output from the image processing part 708.

Document Reading Method.

Next, reading process by the document reading apparatus 600 is described.

In this reading process, in accordance with relation between the image data (luminance value) obtained in the first light source and the image data (luminance value) obtained in the second light source, the light amount of which is smaller than that of the first light source, irregular shadow in the reading areas is identified and the identified irregular shadow is corrected.

In the following description, the image data obtained in the first light source is referred to as "first image data" and the image data obtained in the second light source is referred to as "second image data".

Figure 3A:
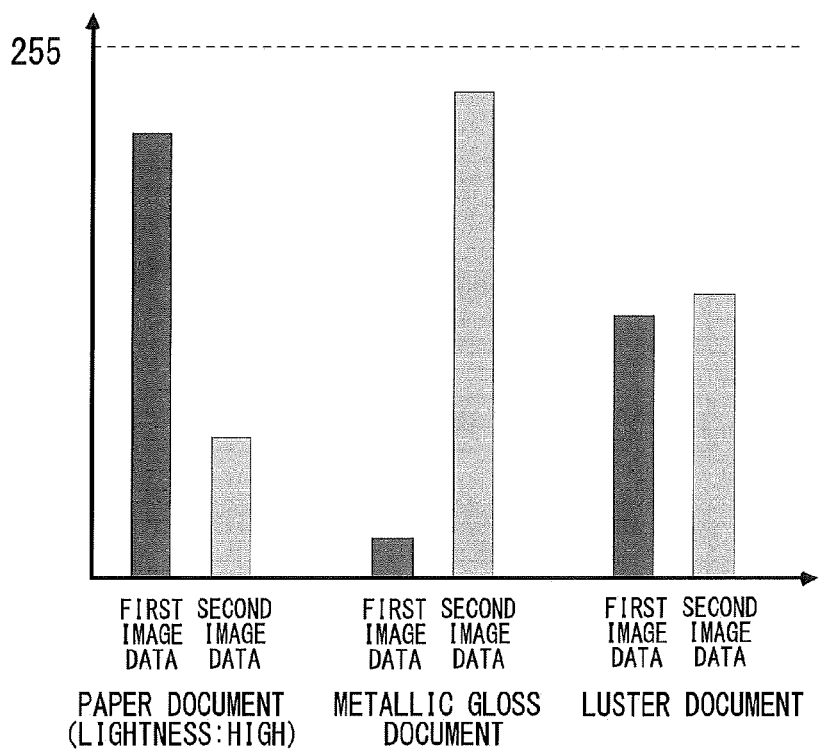
FIG. 3A is a diagram showing comparison results of luminance value of a first image data and a second image data, in which the luminance values of the first data and the second data of paper document having high lightness, metallic gloss document, and luster document are compared.

FIG. 3A is a diagram showing comparison results of the first data (luminance value) and the second data (luminance value), in which the first data (luminance value) and the second data (luminance value) of paper document having high lightness, metallic gloss document, and luster document are respectively compared, in which the illuminance of the document surface of the second light source is one third of that of the first light source.

The reflected light in the paper document is diffused. Therefore, as shown by the ratio of the illuminance of the document surface, the first image data (luminance value) obtained by the first light source shows value which is about three times higher than the second image data (luminance value) obtained by the second light source.

The reflected light in the metallic gloss document is rarely diffused. Therefore, the first image data (luminance value) obtained in the first light source becomes very low. On the other hand, the second image data (luminance value) obtained in the second light source becomes high.

Not so much as the metallic gloss document though, a diffuse reflection light component is reduced and a regular reflection light component is increased in the luster document. Therefore, compared with the paper document, the first image data (luminance value) shows low value and the second image data (luminance value) shows high value in the luster document.

As above, the relation between the first image data (luminance value) and the second image data (luminance value) is apparent for the three types of a document having high lightness.

Figure 3B:
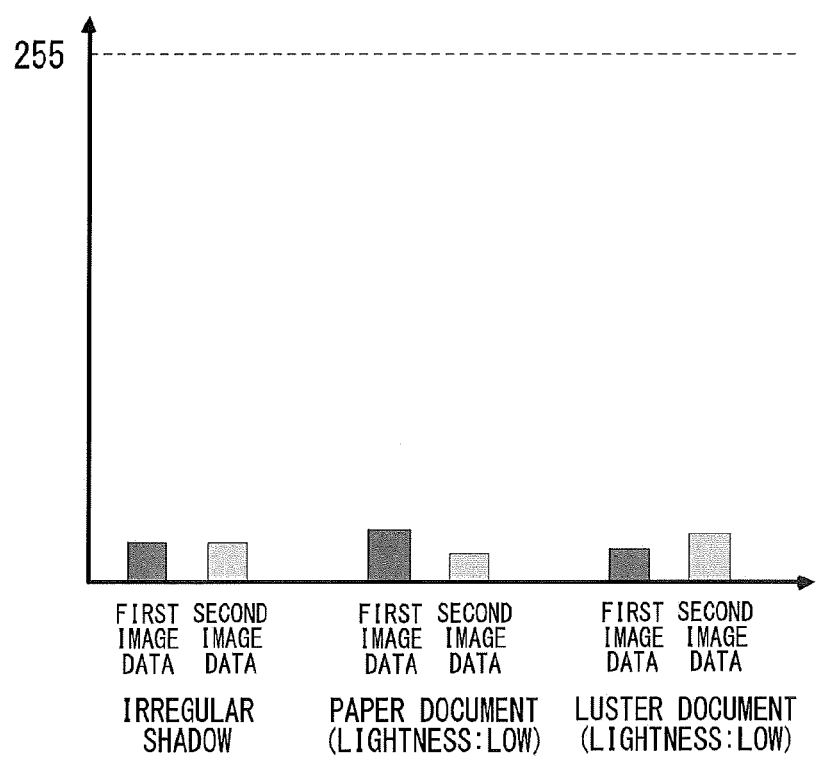
FIG. 3B is a diagram showing comparison result of luminance value of a first image data and a second image data, in which the luminance values of the first data and the second data of irregular shadow, paper document having low lightness, and luster document having low lightness are compared.

On the contrary, FIG. 3B shows comparison result of the first image data and the second image data, in which the first data and the second data of irregular shadow, paper document having low lightness, and luster document having low lightness are respectively compared. The first image data of the pixel corresponding to the irregular shadow shows very low value similar to the case of the metallic gloss document shown in FIG. 3A. Further, similar to the first image data, the second image data of the pixel also shows low value. This is because the reflected light by the second light source 605 travels in a direction different from that of the regular reflection light. Therefore, in relation to the first image data and the second image data, no considerable difference is caused between the document having low lightness and the luster document having low lightness such as a paper document printed in black. Based on such knowledge, in this embodiment, irregular shadows in various documents are identified. In particular, the following document reading method is implemented.

Figure 4:
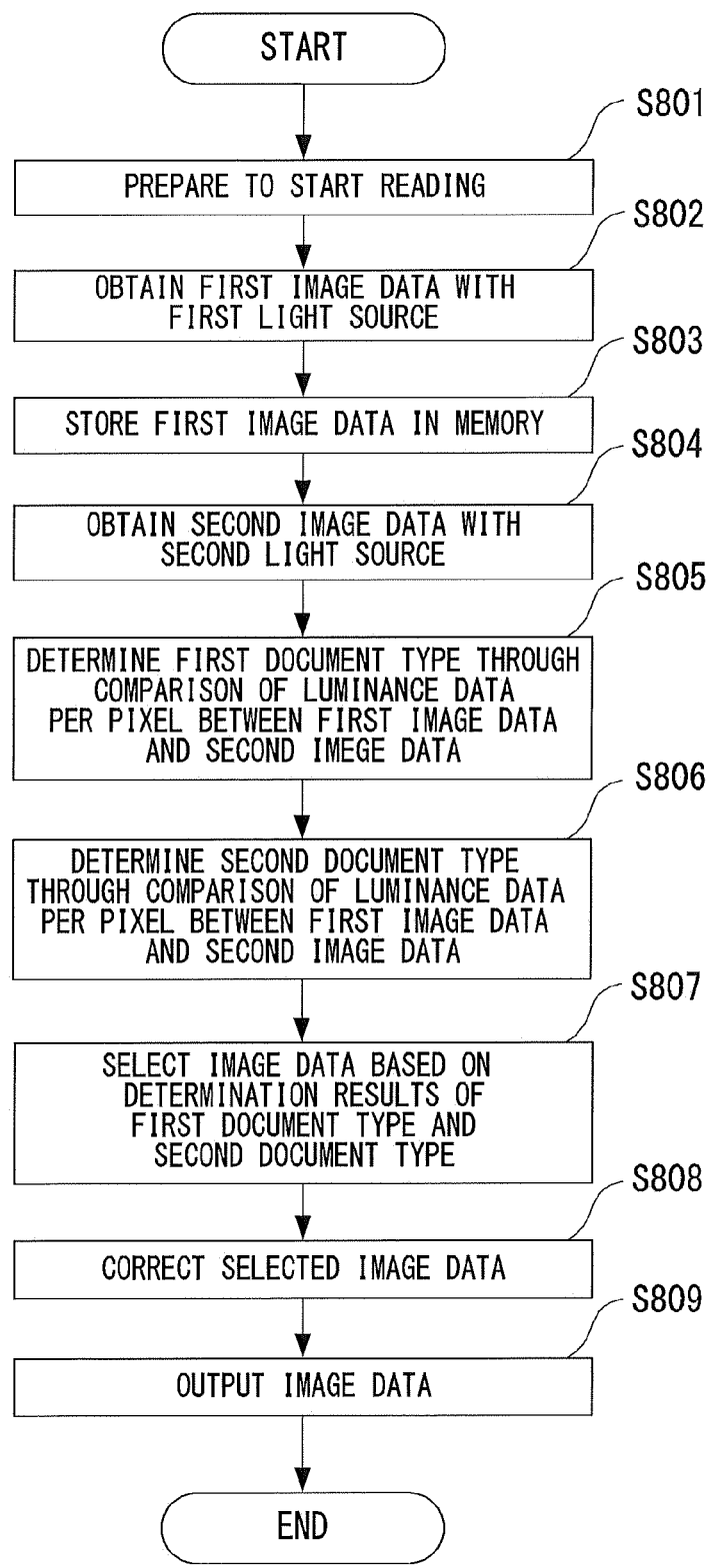
FIG. 4 is an explanatory diagram explaining a main control procedure of reading process.

FIG. 4 is an explanatory diagram for explaining main control procedure by the control part, especially, by the CPU 702.

First, the CPU 702 prepares to start reading (S801). In particular, when receiving an instruction to start reading document through the operation part 701, the CPU 702 causes the first light source 604 and the second light source 605 to light to read an image of the above-mentioned reference plate. Then, the SHD coefficients 701 and 711 are calculated. The calculated results are then stored in a memory (not shown).

Next, the CPU 702 reads a document with the first light source (S803). It means that the first light source 604 is lit through the lighting circuit 705. At this time, the second light source 605 is turned off. The CPU 702 irradiates light from the first light source 604 toward the reading areas of the document 601. Along with this, the CPU 702 starts scanning the preset entire image reading area by the illumination unit 611. The image reading area is generally set through the user's operation of the operation part 701. Also, the image reading area may automatically be set using any known document size automatic detecting function. The reflection light from the document 601 is guided to the photoelectric conversion element 610.

The photoelectric conversion element 610 converts the received reflected light to analog image signal. The AFE 707 converts the analog image signal to first digital image data. The first image data is corrected based on the SHD coefficient 710 in the SHD correction part 609. The first image data obtained in this way is stored in a given memory such as RAM 712 (S803).

When the storing of the first image data is finished, the CPU 702 reads a document by the second light source 605 (S804). It means that the second light source 605 is lit through the lighting circuit 706. At this time, the first light source 604 is turned off. The CPU 702 irradiates light from the second light source 605 toward the reading areas of the document 601 and starts scanning the entire image reading area by the illumination unit 611. The reflection light from the document 601 is guided to the photoelectric conversion element 610.

The photoelectric conversion element 610 converts the received reflected light to analog image signal. The AFE 707 converts the analog image signal to second digital image data. The second image data is corrected based on the SHD coefficient 711 in the SHD correction part 609.

The second image data obtained in this way is compared, per pixel, with the stored first image data in the document type determination part 713. Then, the type of the read document is determined, whether it is the metallic gloss document, the luster document or the paper document (S805). This process is called first determination process. The type of the document determined through the first determination process is called "first document type". After determining the first document type, the document type determination part 713 further determines the type of the document, whether or not it is with irregular shadow (S806). This process is called second determination process. The type of the document determined by the second determination process is called "second document type".

When the second determination process is finished, the CPU 702 selects image data in accordance with the respective determination results (S807). For example, the pixel determined to be paper document selects the first image data. On the other hand, the pixel determined to be metallic gloss document selects the second image data. Then, the CPU 702 causes the image correction part 715 to execute correction process in accordance with the determination result.

For example, instead of being determined to be paper document or metallic gloss document, if the document is determined to be a luster document, the pixel thereof or the pixel determined to be of the irregular shadow is corrected by giving offset or gain to the first image data (S808).

The CPU 702 outputs the image data selected and corrected in this way, that is, the image data representing the document content is output (S809) and control for the document reading process is ended.

In the above-mentioned control procedure, the first image data obtained through the irradiation of light from the first light source 604 is obtained during forward scanning. The second image data obtained through the irradiation of light from the second light source 605 is obtained during backward scanning. This enables to obtain two types of image data with one reciprocative scanning, which allows to increase reading efficiency.

As another example of controlling procedure, the scanning may be performed, by line units, by switching the first light source 604 and the second light source 605 each other. This enables to control such that two image data are obtained by only performing the forward scanning.

Description is made in detail with regard to the first determination process and the second determination process in this embodiment.

First Determination Process

Figure 5:
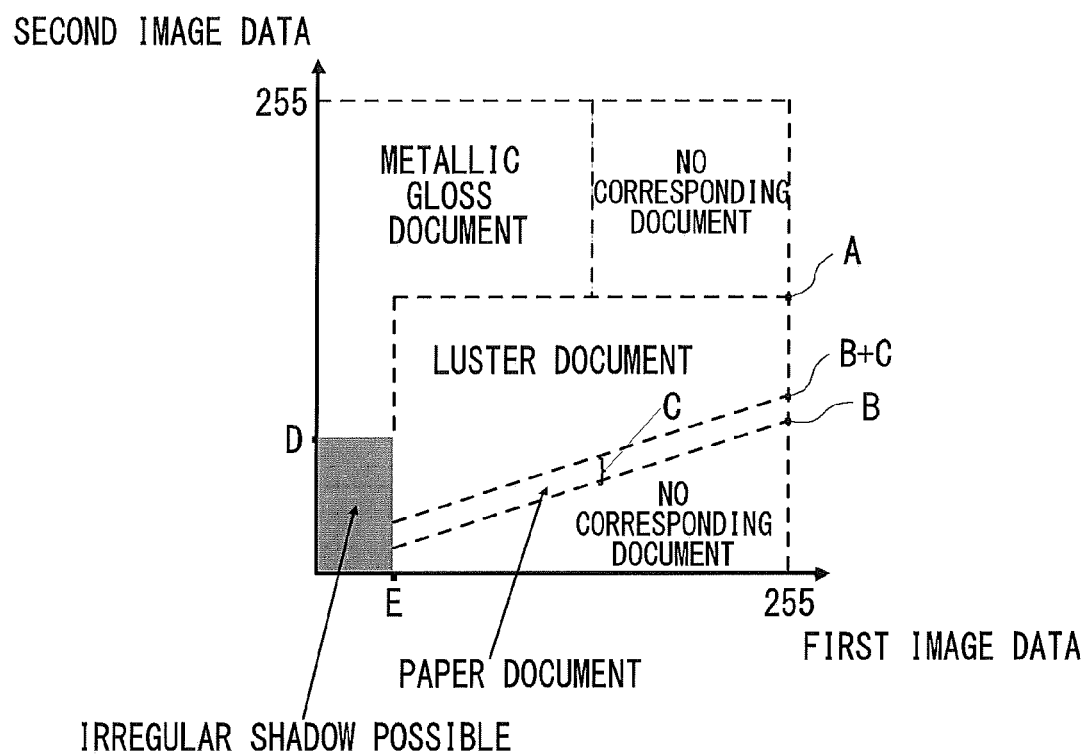
FIG. 5 is an explanatory diagram explaining a method for determining document type.

The first determination process by the document type determination part 713 is performed by detecting the glossiness of the document 601, in particular, by detecting the luminance value of each image data for each pixel of red (R), green (G) and blue (B). FIG. 5 shows an example of various combinations of reference value used for the determination process. The horizontal axis of FIG. 5 is the luminance value when the first image data is represented by 256 gradations. The vertical axis is the luminance value when the second image data is represented by 256 gradations. A point A in FIG. 5 is a threshold value. This is a reference value for determining whether or not the read document is the metallic gloss document. Except an area "having the possibility of irregular shadow" (hereinafter referred to as "irregular shadow possible), which will be described later, the document is determined to be metallic gloss document in an area surrounded by the vertical axis and a straight line connecting from the origin to a point E.

A point B in FIG. 5 is a combined reference value for determining whether the document is paper document or luster document. The combined reference value is determined by the ratio between the illuminance of the document surface by the first light source 604 and the illuminance of the document surface by the second light source 605. For example, if the light amount comparison value between the first light source and the second light source is three to one (3:1), the point B is calculated to "85" by 255/3. Generally, a paper document has some gloss. Therefore, such an area as surrounded by a straight line connecting from the origin to the point B and the point E, which will be described later, and the horizontal axis will not exist. Also, such an area where both the first image data and the second image data take high luminance value will not exist. Therefore, these regions are illustrated, in FIG. 5, as "no corresponding document".

A width C in FIG. 5 is a combined reference value (offset value) which defines an area formed between the straight line connecting from the origin to the point B (straight line B) and a straight line obtained by an upwardly translating the straight line B. If the first image data and the second image data of the document is in the defined area, the document is determined to be a paper document. In case of a document having very low glossiness, the light amount comparison value between the first light source 604 and the second light source 605 (illuminance ratio to the document surface) turns the comparison value of each image data as it is. Therefore, it will take a value on the straight line connecting from the origin to the point B. However, as mentioned above, a paper document has some gloss. Therefore, in the area defined by the straight line connecting from the origin to the point B (straight line B) and a straight line obtained by an upward movement of the straight line B along the axis of ordinates, the document is determined to be "luster document". To avoid this, a width along the axis of ordinate of the area, where the document is determined to be paper document, is preset as the width C.

Note that the point B is uniquely determined based on the ratio between the light amount of the first light source 604 and the light amount of the second light source 605 in the reading areas. However, the point A and the width C is arbitrary set by a user.

Each of the point D on the vertical axis and the point E on the horizontal axis is a combined reference value (threshold value) for determining whether there are any possibilities of existing irregular shadow. The luminance values for the first image data and the second image data of the pixel are low, that is, the pixel in the area surrounded by including the point D and the point E is determined to be "irregular shadow possible". In the present embodiment, the second determination process is performed for the pixel determined to be "irregular shadow possible".

Note that, here, the pixel having the possibility of irregular shadow is identified through the first determination process. Furthermore, the pixel is identified in the second determination process and then, the following processes may be performed.

If the first image data shows the luminance value equal to or less than the point E, the type of the document is determined to be metallic gloss document or a document of the pixel having the possibility of irregular shadow based on the luminance value of the second image data. Regardless of whether the document is determined to be metallic gloss document or a document of the pixel having the possibility of irregular shadow, the luminance value of the first image data of these documents is very small. Therefore, taking into consideration of variation, it is desirable to previously adjust and set the point D and the point E to some appropriate values. Through the adjustment of the value of the point D, the user can set so as to determine the document to be the document having the possibility of irregular shadow even the luminance value of each image data is relatively high. Also, the user can set so as to determine the document type to be the document having the possibility of irregular shadow only when the luminance value of any of the image data is low.

Second Determination Process

Figure 6:
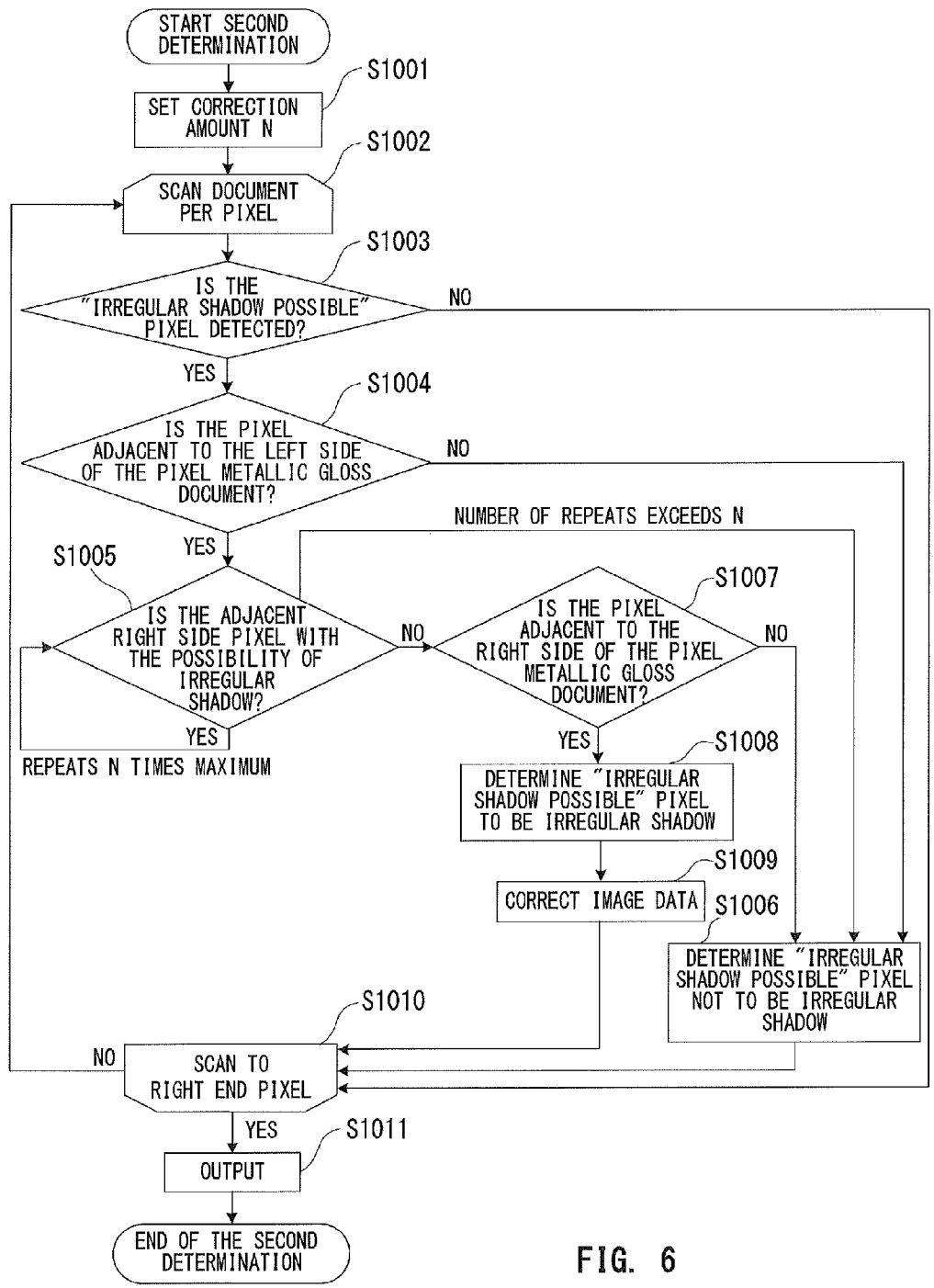
FIG. 6 is an explanatory diagram explaining how to process pixel determined to be "irregular shadow possible".

The second determination process performed by the document type determination part 714 is the determination process to verify, to the pixel having been determined with the possibility of irregular shadow as a result of the first determination process, whether or not the pixel having the possibility of irregular shadow is indeed the irregular shadow. The content of the determination process is described with reference to FIG. 6.

The document type determination part 714 first sets correction amount N (S1001). The correction amount N is a threshold value for determining, in a case where there are more continuing pixels with having possibility of irregular shadow than the correction amount N, the pixel is not of the irregular shadow. The correction amount N is arbitrary set by the user.

When performing the second determination process, the CPU 702 scans the document from the left side with respect to a main scanning direction based on the result obtained by the first determination process (S1002). If the pixel having the possibility of irregular shadow is detected during the process (S1003: Yes), the document type determination part 714 determines the type of the document of the pixel adjacent to the left side of the pixel (front pixel), whether or not it is the metallic gloss document (S1004). If the left side pixel (front pixel) is determined not to be the metallic gloss document (S1004: No), the pixel determined to be the pixel having the possibility of irregular shadow in the first determination process is determined not to be of the irregular shadow (S1006).

If, in the process of step S1004, the left side pixel (front pixel) is determined to be the metallic gloss document (S1004: Yes), the second determination process is proceeded in a following procedure.

When the pixel adjacent to the right side of the detected pixel having the possibility of irregular shadow is identified, which is then determined to be the pixel having the possibility of irregular shadow, determination is made to the next adjacent right side pixel, whether or not it is the pixel having the possibility of irregular shadow. This process is repeatedly performed N times at the maximum (N is a number as set as a correction amount) as long as the adjacent right side pixel is continuously determined to be the pixel having the possibility of irregular shadow (S1005: Yes). If the number of repeats exceeds the correction amount N, that is, if the pixel having the possibility of irregular shadow is continued more than N times, the pixel having the possibility of irregular shadow is determined not to be of the irregular shadow (S1006).

Further, when the process is repeated the number of times which is not exceeding the correction amount N and the document of the right side pixel (rear pixel) is determined to be metallic gloss document (S1007: Yes), the continuing pixels having the possibility of irregular shadow are determined to be of the irregular shadow.

The pixel having been determined to be of the irregular shadow is corrected so as to reduce difference with the metallic gloss document. The correction includes giving offset or gain to the image data, and allocating the same luminance value as that of the pixel of the adjacent metallic gloss document (S1009). Note that the process of the step S1009 corresponds to the process of step S808 shown in FIG. 4.

In the process of step S1003, when no pixel having the possibility of irregular shadow is detected (S1003: No), or when scanning is not performed to the right end pixel, processes after step S1002 are repeated. When scanning is performed to the right end pixel in the main scanning direction (S1010: Yes), the corrected image data is output (S1011). This ends the second determination process (S1011).

As above, when the metallic gloss document is read, the irregular shadow is partially generated depending on the surface shape. Therefore, if the pixel having been determined to be the metallic gloss document is detected around the pixel having the possibility of irregular shadow, the pixel having the possibility of irregular shadow is determined to be of the irregular shadow.

Note that, the larger correction amount N allows to correct wider range of irregular shadow of pixel. It is also available to set the correction amount N which is also adaptable to a fine hot stamping pattern. Also, scanning not only in the main scanning direction but in the sub-scanning direction, accuracy of correction is enhanced.

Figure 7:
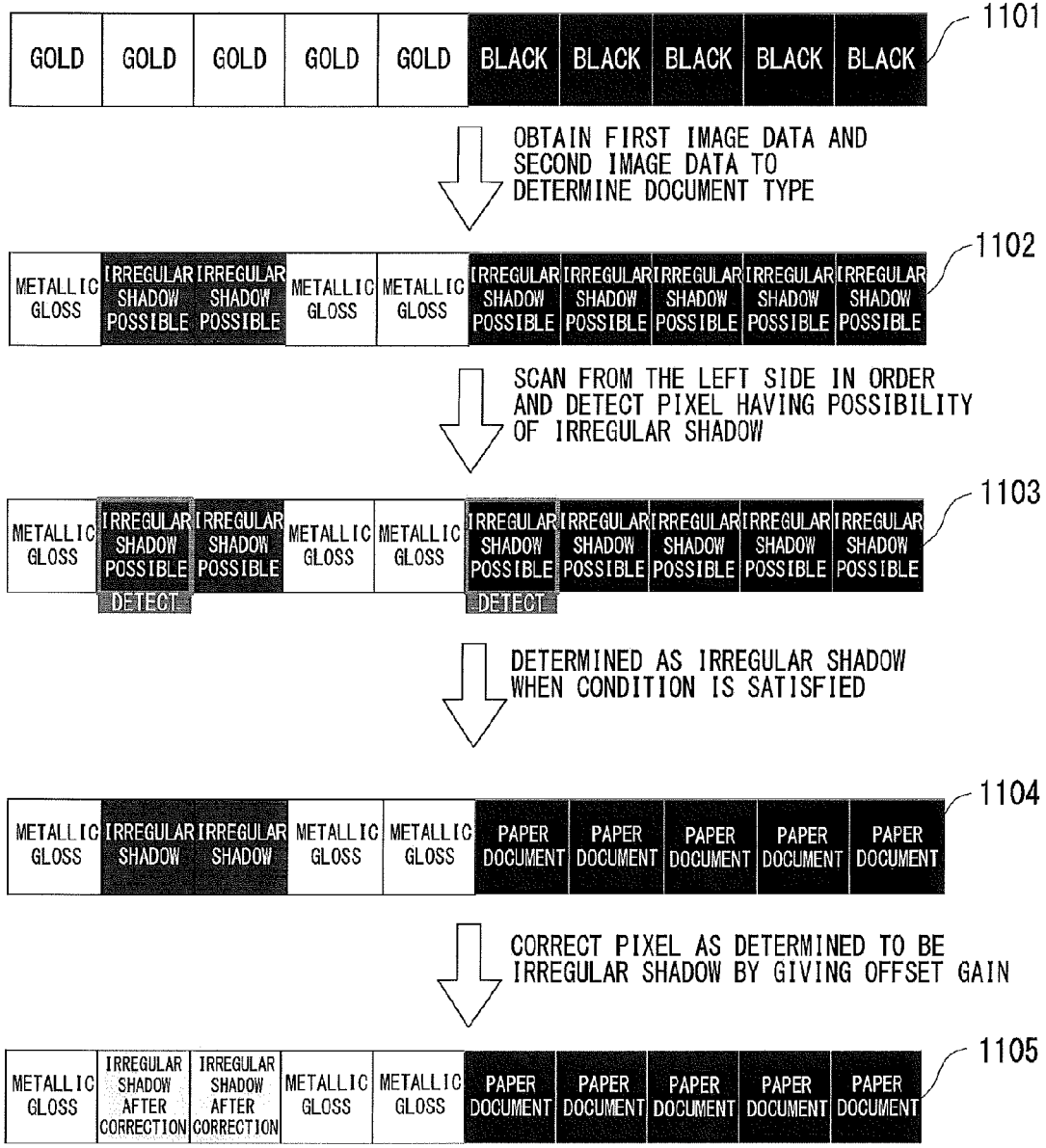
FIG. 7 is a specific example showing how to process pixel determined to be "irregular shadow possible".
Figure 8:
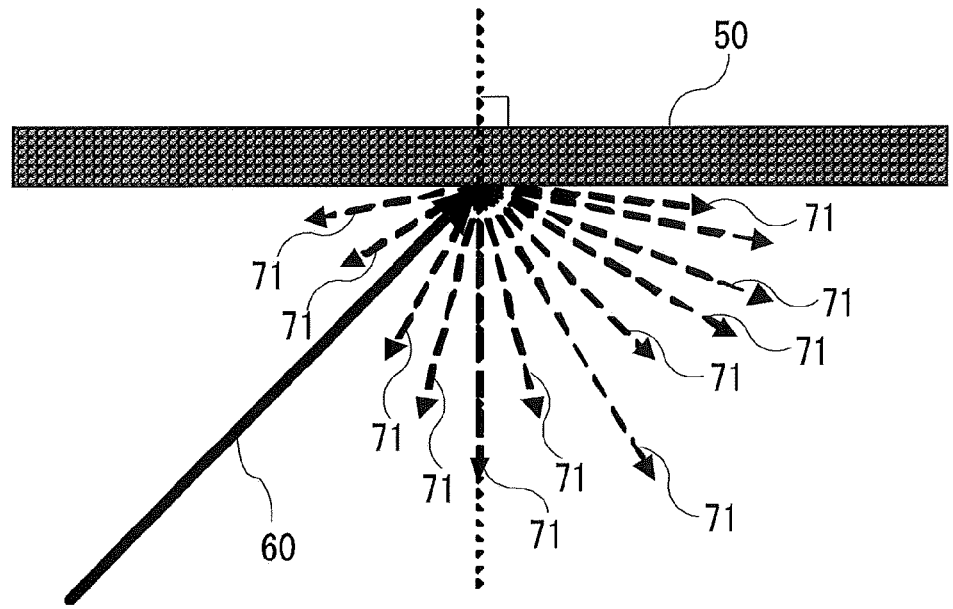
FIG. 8 is a schematic diagram showing, with arrow lines, reflection direction of light irradiated toward paper document.
Figure 9:
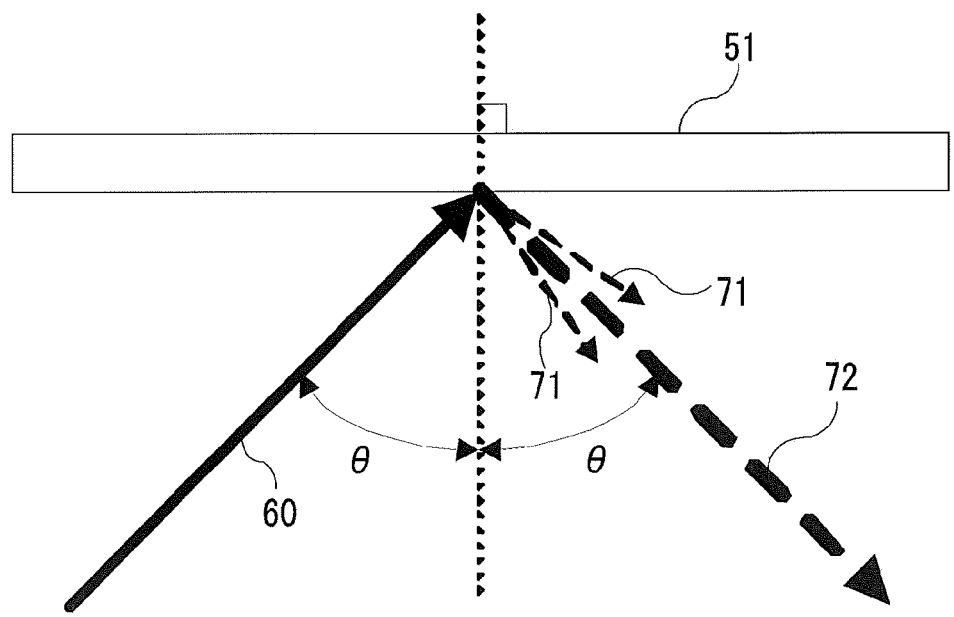
FIG. 9 is a schematic diagram showing, with arrow lines, reflection direction of light irradiated toward document surface having high metallic gloss.
Figures 10A, 10B:
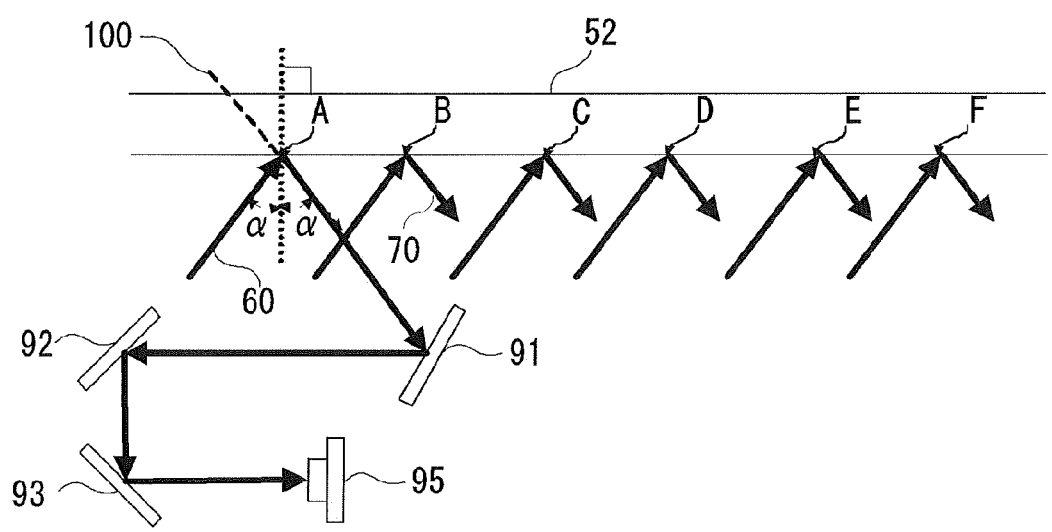
FIG. 10A is a schematic diagram illustrating reflected light in reading areas A to F of a document 52 having a surface, which is an ideal mirror in terms of its surface condition such as glossiness, flatness, surface roughness.
FIG. 10B is a diagram showing an image data in the reading areas.
Figure 11A:
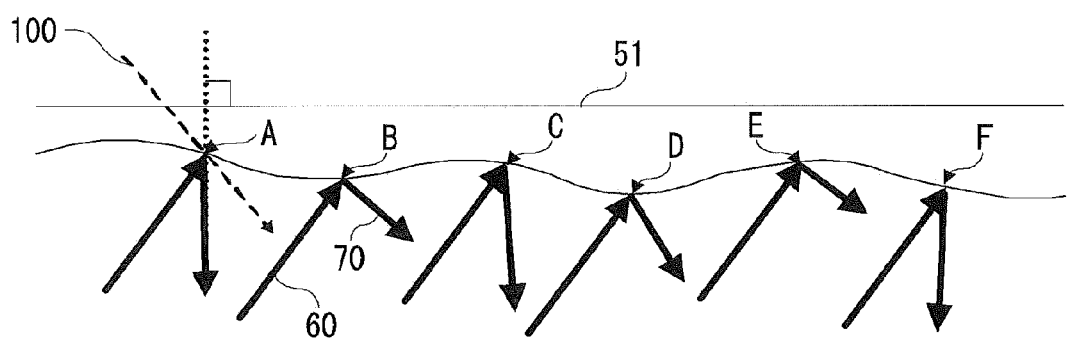
FIG. 11A is a schematic diagram illustrating reflected light in the reading areas in case of a document having high surface glossiness.
Figure 11B:
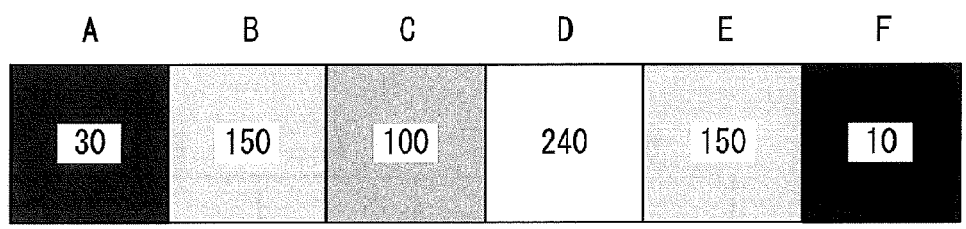
FIG. 11B is a diagram showing an image data in the reading areas.

FIG. 7 is an explanatory diagram for specifically explaining the second determination process. A document 1101, which is the reading target, is a paper document, in which, facing front of the drawing, the left side is printed in gold and the right side is printed in black. Here, as one example, the correction amount is set to "3".

The first image data and the second image data are obtained. Through the first determination process, the type of the document is determined. A document image 1102 shows the result. In the document image 1102, a part of the gold pixel and all the black pixels are determined to be the pixels having the possibility of irregular shadow. The document image 1102 is sequentially scanned from the left side for detecting pixels having the possibility of irregular shadow. A document image 1103 shows the result of the detection. In the document image 1103, two pixels are detected as pixels having the possibility of irregular shadow. The pixel having the possibility of irregular shadow is determined to be of the irregular shadow when the condition that the pixel having the possibility of irregular shadow is continued within three times and both ends of the continuing pixels having the possibility of irregular shadow are metallic gloss documents is satisfied. If above condition is not satisfied, the pixel having the possibility of irregular shadow is determined to be paper document. A document image 1104 shows the result.

In the document image 1104, only the second and the third pixels from the left end are determined to be of the irregular shadow. These irregular shadows are corrected by giving offset or gain, replacing with the luminance value of the adjacent pixel. A document image 1105 shows the result. Through the correction of the irregular shadow in this way, reproducibility of the document image can be enhanced.

As above, in the document reading apparatus 600 of the present embodiment, light is irradiated toward the reading areas of the document by the first light source 604 and the second light source 604 and respective reflected lights are received. Then, the luminance values are compared in the document type determination part 713 per pixel. Based on the comparison result, the type of the document is determined, whether it is paper document, luster document, or metallic gloss document. Further, pixel having the possibility of irregular shadow is identified. The document type determination part 714 determines, with respect to the identified pixel, whether or not the pixel is the irregular shadow based on the type of the document of the peripheral pixel adjacent to the pixel. If the pixel is determined to be of the irregular shadow, correction is made to the irregular shadow. Therefore, even there are some irregularities on the reading areas of the document, the irregular shadow can be corrected. Therefore, image document with the corrected irregular shadow is generated.

Also, it is possible to make corrections to the irregular shadow only, which avoids any unnecessary correction. This contributes to an improvement in image reading speed.

The embodiments as described above are to particularly explain the present disclosure and the scope of the present disclosure is not limited to these embodiments.

Further, the present disclosure can be realized by providing a storage medium having stored thereon a software program code for realizing functions of above-mentioned embodiments (for example, functions shown by the flowcharts of FIGS. 4 and 5) with a system or a device.

In this case, the functions of above-mentioned embodiments are realized by causing the computer (or CPU, MPU) of the system or the device to read and execute the program code stored in a computer readable storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-108588, filed May 23, 2013, which is hereby incorporated by reference herein in its entirety.

What is claimed is:

1. A document reading apparatus comprising:
a first light source configured to irradiate light toward a reading area;
a second light source configured to irradiate light toward the reading area from a position different from that of the first light source, a light amount of the second light source being smaller than that of the first light source;
a photoelectric conversion unit configured to receive reflected light from a document in the reading area, and to photoelectrically convert the received reflected light to image data;
a first determination unit configured to determine a document type of a target pixel based on a first image data of the target pixel and a second image data of the target pixel, the first image data is obtained through a photoelectric conversion of the reflected light irradiated from the first light source and the second image data is obtained through a photoelectric conversion of the reflected light irradiated from the second light source;
a second determination unit configured to re-determine a document type of the target pixel based on the determination result of the target pixel and the determination result of peripheral pixel of the target pixel, and
a generation unit configured to generate image data of the target pixel based on the first image data and the second image data in accordance with the document type determined by the first discrimination unit or the second discrimination unit.

2. The document reading apparatus according to claim 1, wherein the document type includes a first document type having high glossiness, a second document type having low glossiness, and a third document type which is different from the first document type and the second document type;
wherein the second determination unit is configured to re-determine the document type of the target pixel determined, by the first determination unit, to be the third document type based on the document type of the adjacent pixel of the target pixel.

3. The document reading apparatus according to claim 2, wherein the generation unit is configured to select the second image data as the image data of the target pixel in a case where the document type of the target pixel is the first document type and to select the first image data as the image data of the target pixel in a case where the document type of the target pixel is the second document type.

4. The document reading apparatus according to claim 1, wherein the first image data and the second image data are data representing an illumination value per pixel; and
wherein the determination unit comprises:
a first determination unit configured to determine pixel corresponding to the first image data and the second image data to be a pixel having a possibility of irregular shadow in a case where a difference of the luminance value between the first image data and the second image data is larger than a predetermined value, and a second determination unit configured to determine the target pixel to be the pixel representing the irregular shadow in a case where the pixel and the peripheral pixel are in a predetermined arrangement relation.

5. The document reading apparatus according to claim 4, wherein the second determination unit is configured to determine, in a case where the number of times the pixel is continuously determined to be the target pixel is less than N (natural number) and the both sides of the target pixels are sandwiched with the pixel of the luminance value exceeding a predetermined multiple of the target pixel, the target pixel of less than N to be the pixel representing the irregular shadow.

6. The document reading apparatus according to claim 5, further comprising a correction unit configured to correct the pixel representing the irregular shadow for reducing a difference of luminance value between that of the pixel representing the irregular shadow and that of the adjacent pixel.

7. A document reading method comprising:
a first obtaining step for obtaining a first image data generated from a reflected light from a document toward which a light from a first light source is irradiated;
a second obtaining step for obtaining a second image data generated from a reflected light from a document toward which a light from a second light source is irradiated from a position different from the first light source;
a first determination step for determining, based on the first image data corresponding to a target pixel and the second image data of the target pixel, a document type of the target pixel;
a second determination step for re-determining a document type of the target pixel based on the determination result of the target pixel and the determination result of a peripheral pixel of the target pixel, and a generation step for generating image data of the target pixel based on the first image data and the second image data in accordance with the document type determined by the first determination step and the second determination step.

8. A non-transitory computer readable storage medium which stores computer-executable instructions for realizing the document reading method as described in claim 7 with a computer.

9. The document reading apparatus according to claim 1, wherein diffused light reflected by the target pixel is guided to the photoelectric conversion unit from the first light source and regular reflection light reflected by the target pixel is guided to the photoelectric conversion unit by the second light source.

10. The document reading apparatus according to claim 1, wherein the document type includes:
a first document type with a first ratio of regular reflection light to reflected light,
a second document type with a second ratio of regular reflection light to reflected light, and
a third document type with a third ratio of regular reflection light to reflected light, wherein the third ratio is smaller than the first ratio and larger than the second ratio.

11. The document reading apparatus according to claim 1, wherein the first image data and the second image data are data representing luminance value per pixel, and
wherein the determination unit comprises a third determination unit to determine, in a case where luminance value of the first image data is lower than a first predetermined value and luminance value of the second image data is lower than a second predetermined value, a pixel corresponding to the first image data and the second image data to be the pixel having a possibility of irregular shadow.

* * * * *